(12) United States Patent
Tien et al.

(10) Patent No.: US 11,308,124 B2
(45) Date of Patent: *Apr. 19, 2022

(54) PROVIDING AN AGGREGATE DISPLAY OF CONTACT DATA FROM INTERNAL AND EXTERNAL SOURCES

(71) Applicant: Microsoft Technology Licensing, LLC, Redmond, WA (US)

(72) Inventors: Ginger Elizabeth Tien, Bellevue, WA (US); Michael Anthony Affronti, Seattle, WA (US); Rikinkumar Shah, Bellevue, WA (US); Christina Marie Meyer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,998

(22) Filed: Feb. 14, 2017

(65) Prior Publication Data

US 2017/0154094 A1 Jun. 1, 2017

Related U.S. Application Data

(63) Continuation of application No. 13/278,029, filed on Oct. 20, 2011, now Pat. No. 9,600,804.

(51) Int. Cl.
*G06F 16/27* (2019.01)
*G06F 16/23* (2019.01)
(Continued)

(52) U.S. Cl.
CPC ........ *G06F 16/275* (2019.01); *G06F 16/2358* (2019.01); *G06F 16/24556* (2019.01);
(Continued)

(58) Field of Classification Search
CPC ........ G06F 17/30575; G06F 17/30581; G06F 16/275; G06F 16/27; G06F 16/2358; G06F 16/24556; G06Q 10/105; G06Q 50/01
(Continued)

(56) References Cited

U.S. PATENT DOCUMENTS 6,278,936 B1 * 8/2001 Jones ..................... G08G 1/127
340/989
6,732,080 B1 * 5/2004 Blants .................. G06Q 10/109
705/7.18
(Continued)

OTHER PUBLICATIONS

Gertner, Abigail et al., "Contact Recommendations from Aggregated On-Line Activity", Published Date: Mar. 1, 2010; located online at: http://www.mitre.org/work/tech_papers/2011/11_0175/11_0175.pdf, 13 pgs.
(Continued)

*Primary Examiner* — Mark E Hershley
(74) *Attorney, Agent, or Firm* — Liang IP, PLLC

(57) ABSTRACT

An aggregate display of contact data from internal and external sources is provided. Contact data associated with at least one contact is obtained from a plurality of sources, including at least an internal source and an external source. The obtained contact data is processed to generate an aggregated collection of contact data. The aggregated collection of contact data is stored. A display of the aggregated collection of contact data is displayed in a single, interactive interface.

20 Claims, 8 Drawing Sheets

(51) Int. Cl.
*G06F 16/2455* (2019.01)
*G06Q 50/00* (2012.01)
*G06Q 10/10* (2012.01)

(52) U.S. Cl.
CPC ........... *G06F 16/27* (2019.01); *G06Q 10/105* (2013.01); *G06Q 50/01* (2013.01)

(58) Field of Classification Search
USPC ........................................................ 707/616
See application file for complete search history.

(56) References Cited

U.S. PATENT DOCUMENTS

| | | | | |
|---|---|---|---|---|
| 7,043,531 | B1* | 5/2006 | Seibel | G06Q 30/02 705/14.23 |
| 7,624,171 | B1* | 11/2009 | Rodkey | H04L 12/1895 379/88.12 |
| 7,685,245 | B1* | 3/2010 | Rodkey | H04L 51/14 379/88.12 |
| 9,600,804 | B2 | 3/2017 | Tien et al. | |
| 2004/0225525 | A1* | 11/2004 | Weitzman | G06Q 10/10 705/1.1 |
| 2005/0289180 | A1* | 12/2005 | Pabla | G06Q 10/109 |
| 2006/0159109 | A1* | 7/2006 | Lamkin | G06F 17/30174 370/401 |
| 2006/0195472 | A1* | 8/2006 | Cadiz | G06Q 10/10 |
| 2006/0195474 | A1* | 8/2006 | Cadiz | G06Q 10/00 |
| 2008/0104039 | A1* | 5/2008 | Lowson | G06Q 30/00 |
| 2008/0133580 | A1* | 6/2008 | Wanless | H04L 12/5815 |
| 2008/0207183 | A1* | 8/2008 | Root | H04M 3/42348 455/414.2 |
| 2008/0219427 | A1* | 9/2008 | Naono | H04L 65/1059 379/218.01 |
| 2008/0243853 | A1* | 10/2008 | Reding | H04L 51/32 |
| 2008/0300962 | A1* | 12/2008 | Cawston | G06F 17/30557 705/7.13 |
| 2008/0313037 | A1* | 12/2008 | Root | G06Q 30/02 705/14.53 |
| 2009/0029674 | A1 | 1/2009 | Brezina | |
| 2009/0138475 | A1* | 5/2009 | Caulkins | G06Q 10/10 |
| 2009/0254971 | A1* | 10/2009 | Herz | G06Q 10/10 726/1 |
| 2010/0161369 | A1* | 6/2010 | Farrell | G06Q 50/01 705/319 |
| 2010/0169364 | A1* | 7/2010 | Hardt | G06F 17/30861 707/769 |
| 2010/0299352 | A1* | 11/2010 | Price | G06F 3/0482 707/769 |
| 2010/0306185 | A1 | 12/2010 | Smith | |
| 2010/0325222 | A1* | 12/2010 | Taylor | G06F 17/3089 709/206 |
| 2011/0119593 | A1 | 5/2011 | Jacobson | |
| 2011/0167114 | A1* | 7/2011 | Blanchard, III | G06Q 10/10 709/204 |
| 2011/0246304 | A1* | 10/2011 | Hicks | G06Q 30/0261 705/14.58 |
| 2011/0256889 | A1* | 10/2011 | Polis | H04L 67/02 455/456.3 |
| 2012/0226527 | A1* | 9/2012 | Carwile, Jr. | G06Q 10/107 705/7.38 |
| 2012/0254763 | A1* | 10/2012 | Protopapas | G06F 17/30554 715/738 |
| 2013/0080954 | A1* | 3/2013 | Carlhian | H04M 1/274583 715/769 |

OTHER PUBLICATIONS

Synchronoss Technologies, Inc., "Synchronoss Network Address Book", Retrieved Date: Aug. 3, 2011, located online at: http://www.synchronoss.com/doc/Synch%20Network%20AddressBook%20DS%20072010.pdf, 2 pgs.
U.S. Appl. No. 13/278,029, Office Action dated May 9, 2013, 16 pgs.
U.S. Appl. No. 13/278,029, Amendment and Response filed Sep. 9, 2013, 13 pgs.
U.S. Appl. No. 13/278,029, Office Action dated Jan. 3, 2014, 23 pgs.
U.S. Appl. No. 13/278,029, Amendment and Response filed Jul. 3, 2014, 11 pgs.
U.S. Appl. No. 13/278,029, Office Action dated Nov. 20, 2014, 24 pgs.
U.S. Appl. No. 13/278,029, Amendment and Response filed Feb. 20, 2015, 11 pgs.
U.S. Appl. No. 13/278,029, Office Action dated Jun. 18, 2015, 22 pgs.
U.S. Appl. No. 13/278,029, Amendment and Response filed Nov. 18, 2015, 16 pgs.
U.S. Appl. No. 13/278,029, Office Action dated Feb. 25, 2016, 21 pgs.
U.S. Appl. No. 13/278,029, Amendment and Response filed May 27, 2016, 15 pgs.
U.S. Appl. No. 13/278,029, Office Action dated Jun. 15, 2016, 24 pgs.
U.S. Appl. No. 13/278,029, Amendment and Response filed Oct. 7, 2016, 16 pgs.
U.S. Appl. No. 13/278,029, Notice of Allowance dated Nov. 8, 2016, 8 pgs.

\* cited by examiner

PROVIDING AN AGGREGATE DISPLAY OF CONTACT DATA FROM INTERNAL AND EXTERNAL SOURCES

CROSS-REFERENCE TO RELATED APPLICATIONS

This application is a continuation application of U.S. patent application Ser. No. 13/278,029 (now U.S. Pat. No. 9,600,804), entitled "PROVIDING AN AGGREGATE DISPLAY OF CONTACT DATA FROM INTERNAL AND EXTERNAL SOURCES," filed on Oct. 20, 2011, the entire disclosure of which is hereby incorporated herein by reference.

BACKGROUND

A contact manager enables users to easily store and locate contact data. Such contact data includes names, addresses and telephone numbers. However, additional contact data may also be included. Contact data is stored locally by individual users or at a server that may be accessed by a contact manager of a user. Thus, if a user shares contact data with other users, this information is entered into a contact management system that the other users maintain. Unfortunately, the contact management system can contain outdated contact data if not maintained and constantly updated by the user. Yet, it may be hard for the user to know when contact data has changed. Users of social networking services may expose to others profiles that contain valuable contact data. For example, a typical profile may contain a user's name, image, current status, a description of client interest, and so on. This information is usually updated on a regular basis by the user thus providing current contact data.

In an organization, contact data can be stored locally by an individual user, and also by the organization in an address book that is available to all members of the organization. Thus, users may access contact data that is locally stored and that is stored in the address book of the organization. However, contact data for these contacts and others may be accessible from other sources. For example, user may be able to access contact data at multiple places inside and outside an organization's firewall, e.g., a social networking site where a contact has posted contact data. An aggregate display of contact data that enables users to easily find information in one place would be optimal.

SUMMARY OF THE INVENTION

To overcome the limitations described above, and to overcome other limitations that will become apparent upon reading and understanding the present specification, embodiments for providing an aggregate display of contact data, which enables users to locate information in one place, are disclosed. Contact data is retrieved from internal sources, as well as external sources.

The above described problems are solved by an aggregate view of the contact data based on preference order of the sources. Users may identify which source the contact data is retrieved. Additionally, the users can access a profile link to get to the full set of contact data for each original source. Accordingly, embodiments disclosed herein maintain up-to-date contact data automatically. Contact data from internal sources, including sources such as active directory, local Microsoft® Outlook contacts, presence channels, as well as from external sources may be aggregated with external sources. External sources may include any third party database that integrates with the system, including social networking sites, business networking sites, or any other third party source.

An embodiment includes a method for aggregating contact data of a user. The method includes obtaining contact data associated with at least one contact from a plurality of sources, including at least an internal source and an external source, processing the obtained contact data to generate an aggregated collection of contact data, storing the aggregated collection of contact data and accessing the aggregated collection of contact data and presenting a display of the aggregated collection of contact data in a single, interactive interface.

In another embodiment, a system for aggregating and displaying contact data is disclosed. The system includes memory for storing data and a processor, coupled to the memory, the processor configured to obtain contact data associated with at least one contact from a plurality of sources, including at least an internal source and an external source, to process the obtained contact data to generate an aggregated collection of contact data, to store the aggregated collection of contact data and to present a display of the aggregated collection of contact data in a single, interactive interface.

In another embodiment, a computer readable medium including executable instructions which, when executed by a processor, provides a suitable computing environment for aggregating and displaying contact data is disclosed. The executable instructions of the computer readable medium includes obtaining contact data associated with at least one contact from a plurality of sources, including at least an internal source and an external source, processing the obtained contact data to generate an aggregated collection of contact data, storing the aggregated collection of contact data and accessing the aggregated collection of contact data to present a display of the aggregated collection of contact data in a single, interactive interface.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

Referring now to the drawings in which like reference numbers represent corresponding parts throughout.

DETAILED DESCRIPTION

Embodiments of the present invention are directed to providing an aggregate display of contact data from internal and external sources. Herein, contact data will be used to refer to personal information associated with a contact in a user's social network. For example, personal information can include personal notes/journal, address books, lists (including task lists), calendar dates, reminders, email, instant message archives, fax communications, voicemail, project management features, RSS/Atom feeds, alerts, references (including scientific references, websites of interest), etc. Those skilled in the art will recognize that contact data as used herein is not meant to be limited to the list provided above, but may include additional information used in a social context, whether associated with work, friends, families, hobbies, group associations or other contexts.

Figure 1:
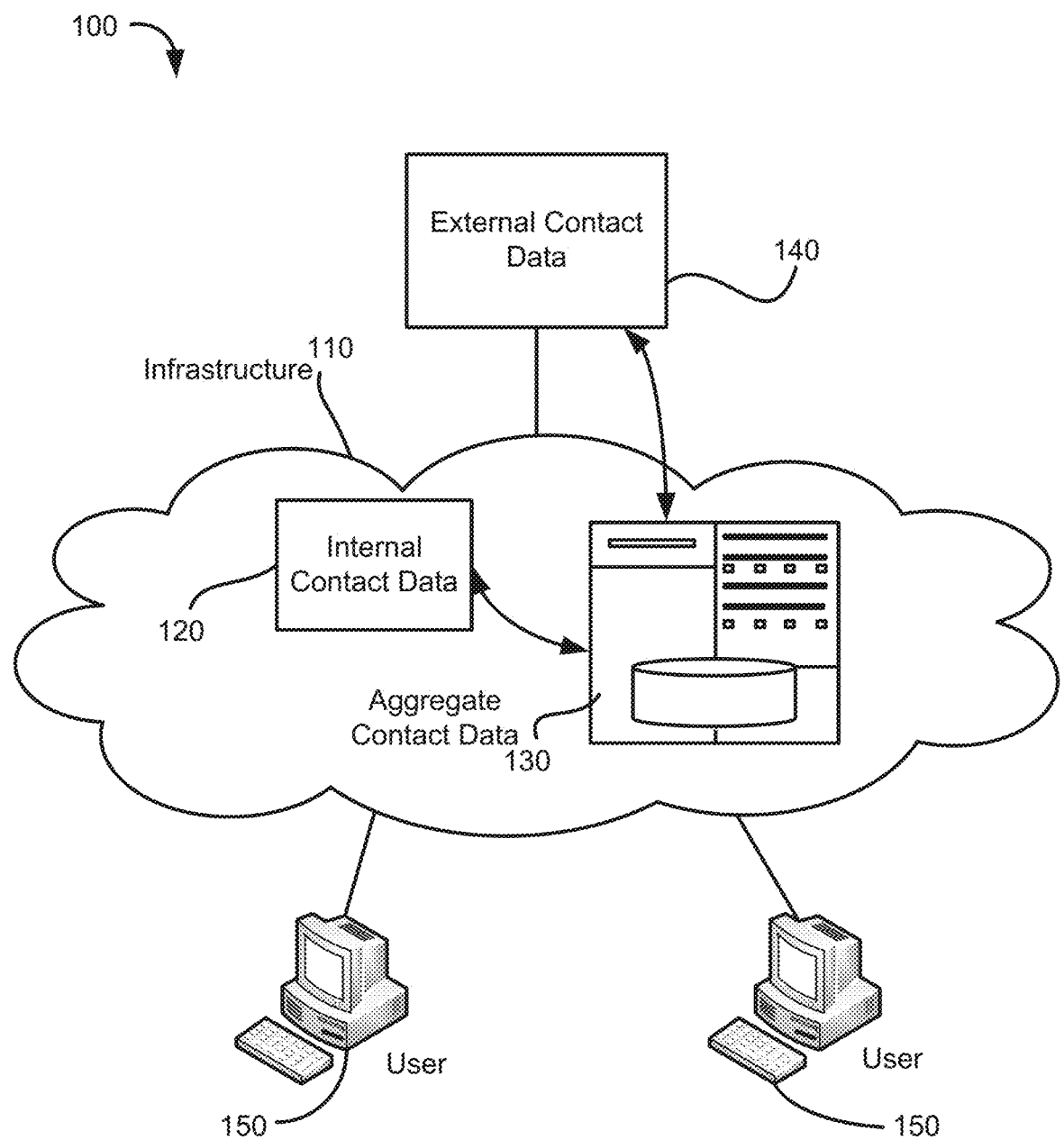
FIG. 1 is a simplified diagram of an infrastructure illustrating an aggregate contact data solution according to an embodiment.

FIG. 1 illustrates an infrastructure diagram 100 illustrating an aggregate contact data solution according to one embodiment. All the internal contact data 120 and the aggregate contact data 130 are controlled within the infrastructure 110. Also, external contact data 140 is retrieved and input to the aggregate contact data 130. The aggregate display enables users 150 to view and access the data in one place. Internal contact data 120 is retrieved from internal contact sources that may include sources such as active directory, global address list (GAL), local Microsoft® Outlook contacts, and SharePoint® contacts. Additionally, external contact data 140 is retrieved from external contact sources. External contact data 140 may be obtained from any third party service that integrates with the system, for example, social networking sites, business networking sites, or any other third party source. Thus the aggregate display of contact data is a mix of information that is entered and stored by the user, entered and published by the contact, as well as stored/maintained externally. Contact data that the user 150 views stays up to date if the publisher on the third party network updates the information.

Figure 2:
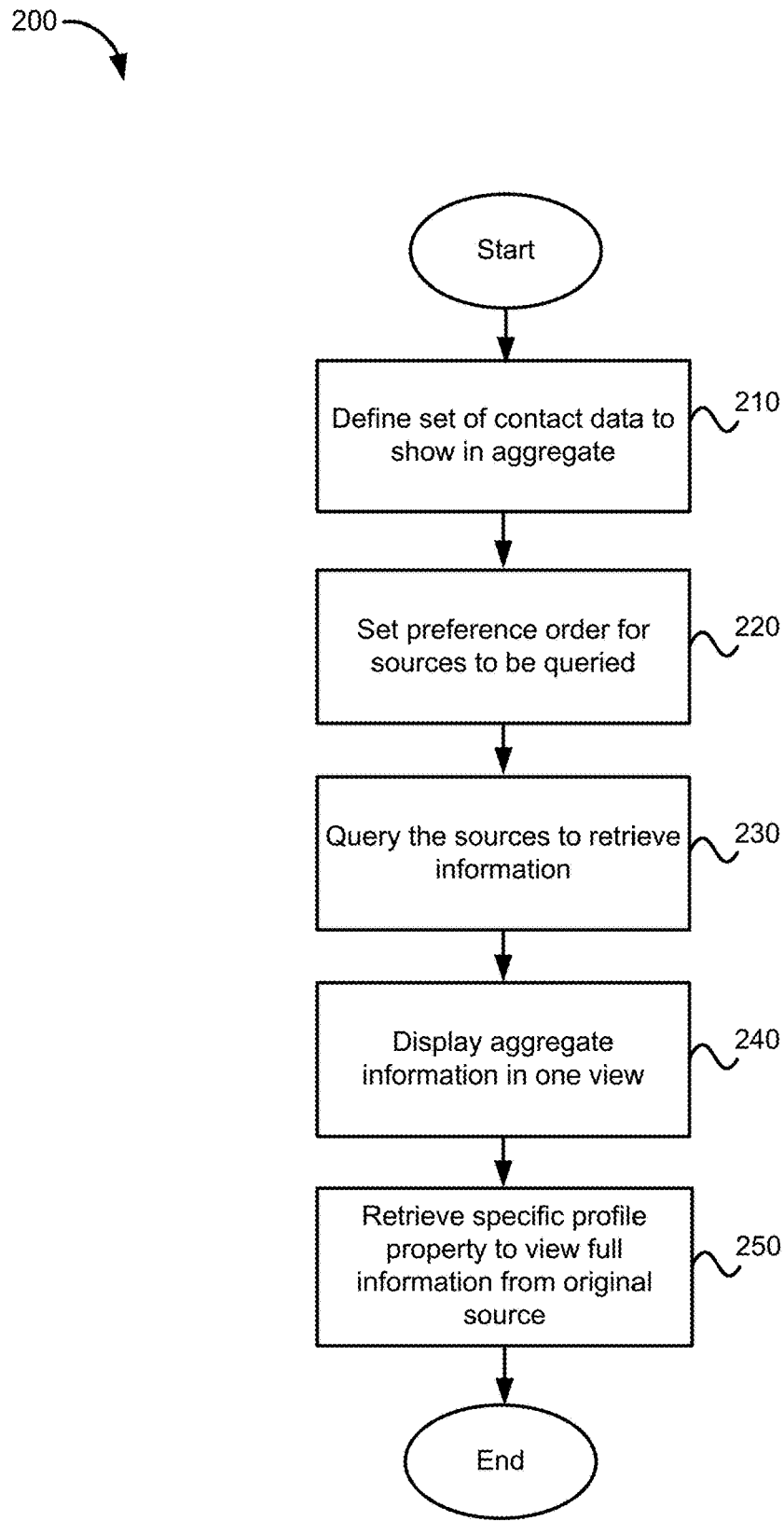
FIG. 2 is a flow diagram of the process for aggregate display of contact data from internal and external sources according to one embodiment.

FIG. 2 is a diagram of the method for providing aggregate contact data displays 200 according to one embodiment. The user may define a set of contact data to show in aggregate 210, with data coming from multiple internal and external sources. Additionally, the user choses contact data from each source that is compatible with the system's contact schema, which may be set or predetermined by the user. After determining the contact sources to be queried, the user may define a preference order for the sources 220. The system queries each piece of contact data in the defined set 230. Thus, the system defines the ranking of the contact data according to the preference order for the source. The ranking order is provided to the user interface so it can be displayed in one view in a systematic way 240. Now, instead of going to multiple places to view internal and external contact data, it is shown in one view, in context across a working environment, e.g., Microsoft® Office, so users do not have to leave the context of their work to learn more about a person. As information is updated in the original store from which the contact data is retrieved, the user interface will retrieve the update and show the most up to date contact data in the user interface. Since not all of the contact data from every source is aggregated in the user interface, users may retrieve the original profile display link or location for each source listed as a "profile" property; thus users can go to the original internal or external source to find more information 250.

Figure 3:
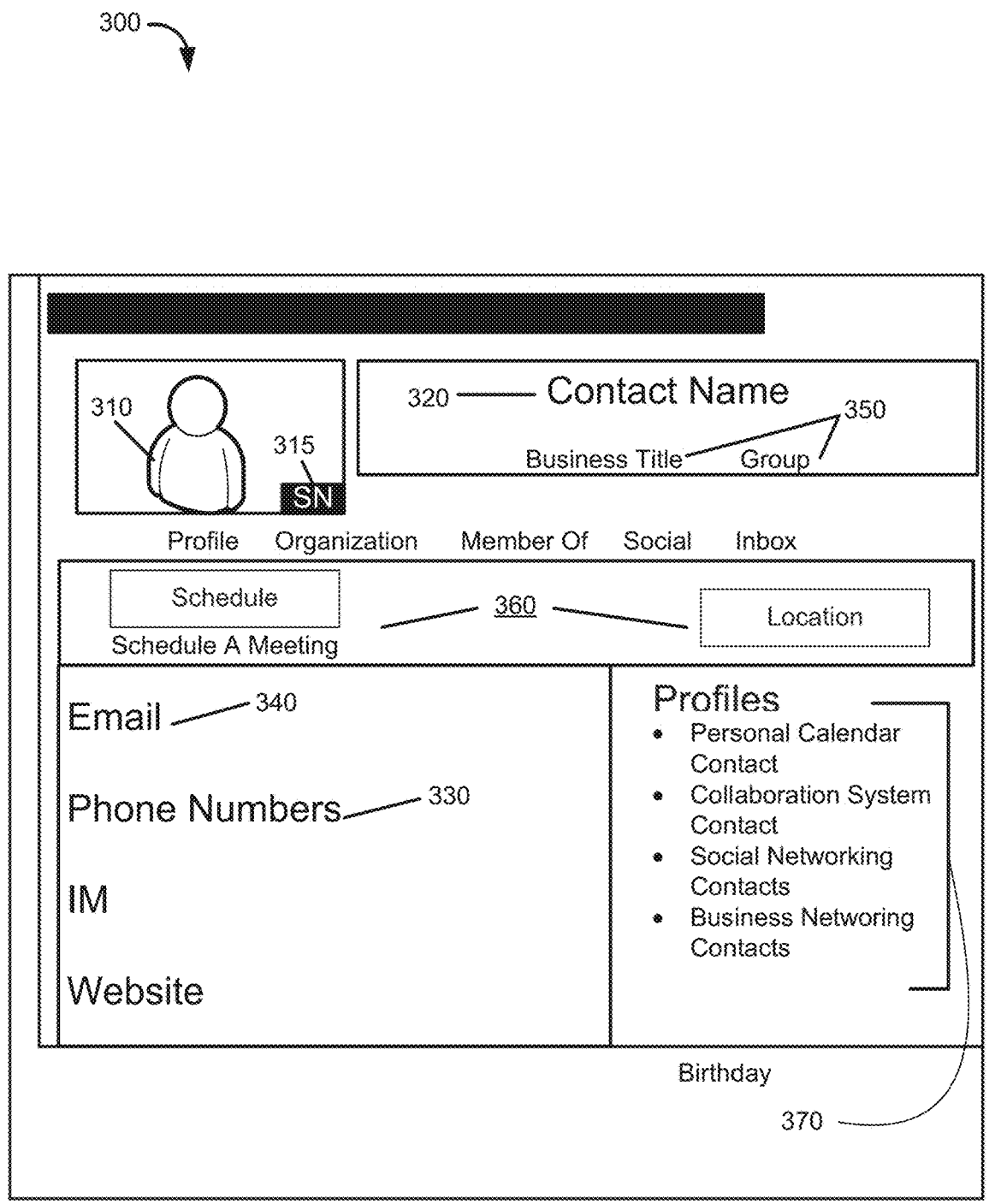
FIG. 3 illustrates the user interface screen for aggregate contact data according to one embodiment.

FIG. 3 illustrates the user interface screen for displaying aggregate contact data 300 according to one embodiment. The user interface displaying an aggregate view of contact data 300 may include a picture 310, name 320, phone numbers 330, email addresses 340, etc., as well as job information such as title and employer group 350, schedule and location 360 that helps people get to know or stay in touch with the contact. Aggregate view of contact data is shown based on preference order defined in the system. Users can tell from the profile 370 sources for contact data provided by an indicator 315 associated with the contact data source. For example, a picture 310 from social or business networking sites may be displayed for the contact. The user will know the source as indicated by the indicator 315, or profile symbol, in the corner of the picture 310. The user interface 300 shows that information is retrieved for the contact from a combination of profiles 370, such as Microsoft® Outlook (personal information manager) contacts, SharePoint® (web application platforms), social networking sites, business networking sites, or any other third party source. The user can view all the information in one place rather than go to multiple sources to view the information. If a specific piece of information is not aggregated on the user interface screen 300, the user may click on an indicator 315 in the profiles 370 to view the full set of information for that source.

Figure 4:
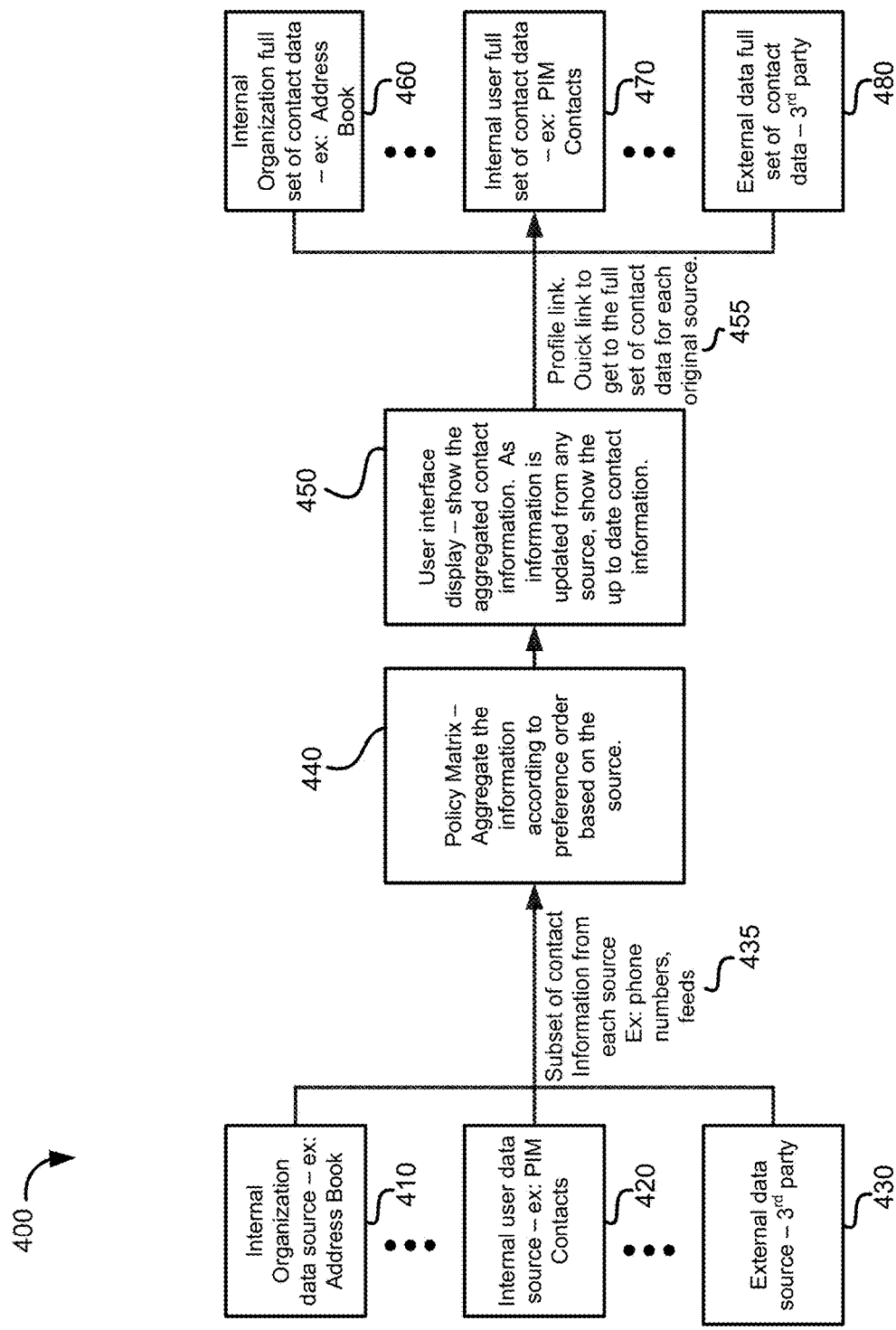
FIG. 4 provides a diagram that illustrates the aggregate contact data is retrieved from both internal and external sources according to one embodiment.

FIG. 4 provides a diagram 400 that illustrates the aggregate contact data is retrieved from both internal and external sources according to one embodiment. A set of information is retrieved and aggregated to show in a single display. The user interface shows where information is sourced from the user interface provides a way to easily get to the original source of information to view the full set of information for that source.

Accordingly, contact data is retrieved from internal and external sources. Internal sources may include internal organization data sources 410, e.g., an address book, and internal user data sources 420 (e.g., Microsoft® Outlook contacts). Additionally contact data may be retrieved from external sources 430 which may be any third party service that integrates with the system. A subset of contact data from each source 435 is obtained to aggregate the information according to preference order based on the source 440. The user interface display 450 shows the aggregated contact data in one systematic view. The display will reflect the up to date information as it is updated from any source. A profile link may be retrieved providing a quick link to the full set of contact data for each original source 455. This will allow the user to view the full set of contact data from sources, such as internal organization 460, internal user 470, or external third party 480 data sources.

Figure 5:
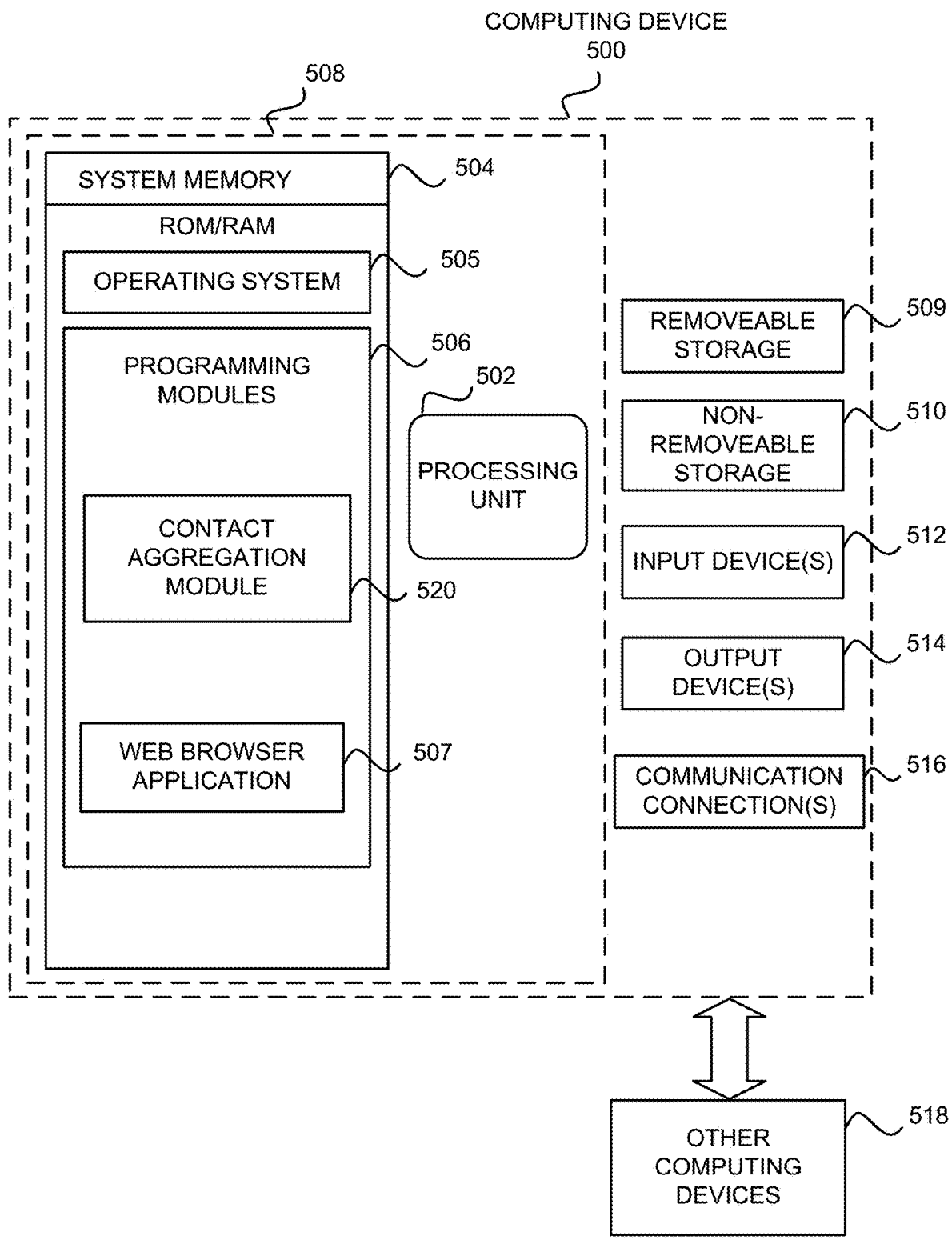
FIG. 5 is a simplified block diagram of a computing device with which embodiments of the present invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 5-7 and the associated descriptions provide a discussion of a variety of operating environments in which embodiments may be practiced. However, the devices and systems illustrated and discussed with respect to FIGS. 5-7 are for purposes of example and illustration and are not limiting of a vast number of computing device configurations that may be utilized for practicing embodiments, described herein.

FIG. 5 is a block diagram illustrating example physical components of a computing device 500 with which embodiments may be practiced. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include the contact aggregation module 520 for providing updated aggregate contact information. Operating system 505, for example, may be suitable for controlling the operation of computing device 500. Furthermore, embodiments may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510.

As stated above, a number of program modules and data files may be stored in system memory 504, including operating system 505. While executing on processing unit 502, programming modules 506, such as the contact aggregation module 520, may perform processes including, for example, one or more of the processes described above with reference to FIGS. 1-4. The aforementioned processes are an example, and processing unit 502 may perform other processes. Other programming modules that may be used in accordance with embodiments may include electronic mail and contacts applications, word processing applications, spreadsheet applications, database applications, slide presentation applications, drawing or computer-aided application programs, etc.

Generally, consistent with embodiments, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip containing electronic elements or microprocessors. For example, embodiments may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the contact aggregation module 520 may be operated via application-specific logic integrated with other components of the computing device/system 500 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Embodiments, for example, may be implemented as a computer process (method), a computing system, or as an article of manufacture, such as a computer program product or computer-readable storage medium. The computer program product may be a computer-readable storage medium readable by a computer system and encoding a computer program of instructions for executing a computer process.

The term computer-readable storage medium as used herein may include computer storage media. Computer storage media may include volatile and nonvolatile, removable and non-removable media implemented in any method or technology for storage of information, such as computer-readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of computing device 500. Computing device 500 may also have input device(s) 512 such as a keyboard, a mouse, a pen, a sound input device, a touch input device, etc. One of the program modules 506 may include a web browser application 507. Output device(s) 514 such as a display, speakers, a printer, etc. may also be included. The computing device 500 also includes communications connections 516. Other computing device 518 may communicate with computing device 500, e.g., through communication connections 516. The aforementioned devices are examples and others may be used.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
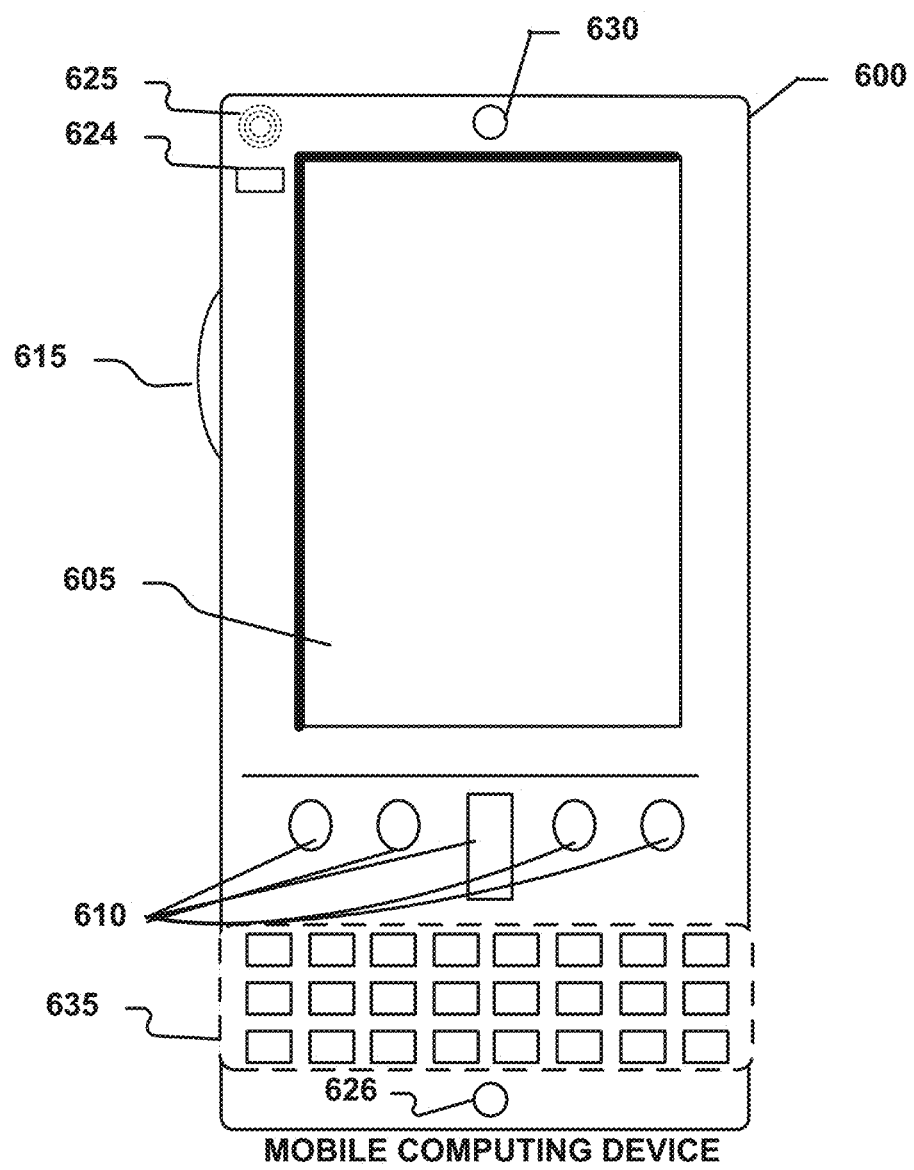
FIGS. 6a-b are simplified block diagrams of a mobile computing device with which embodiments of the present invention may be practiced.
Figure 6B:
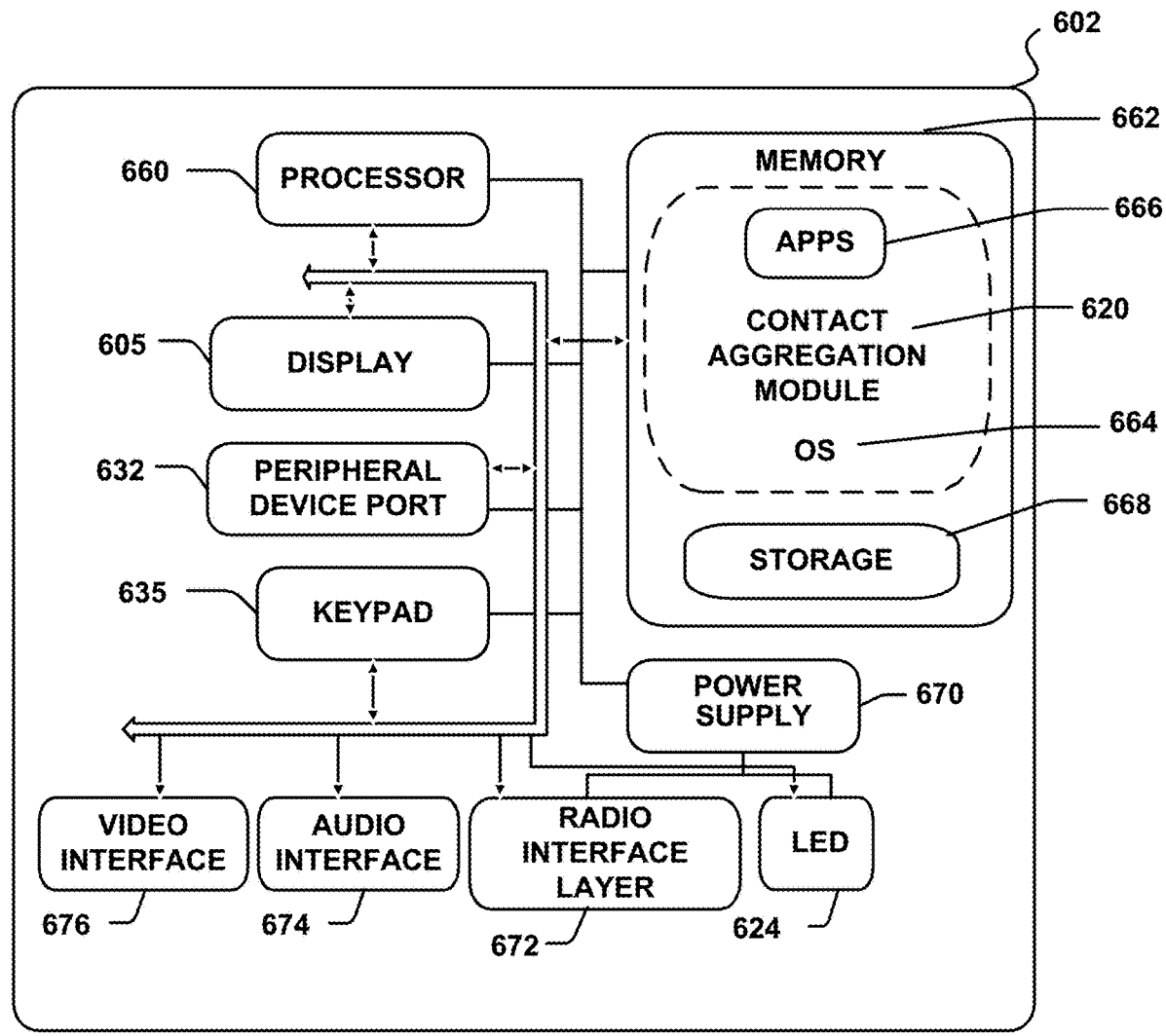
Figure 7:
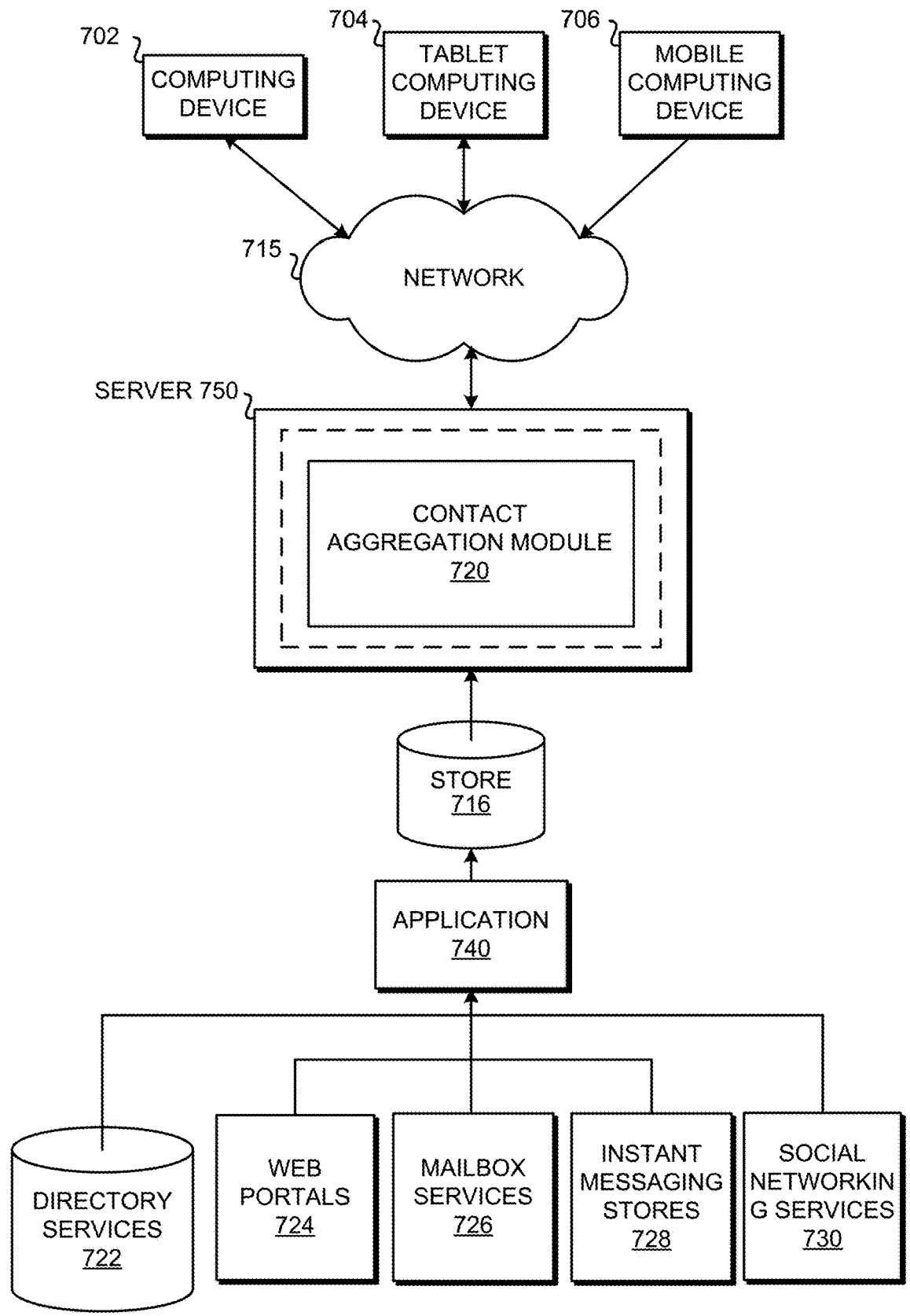
FIG. 7 is a simplified block diagram of a distributed computing system in which embodiments of the present invention may be practiced.

FIGS. 6a-b illustrate a suitable mobile computing environment, for example, a mobile computing device 600, e.g., a smart phone, a tablet personal computer, a laptop computer, and the like, with which embodiments may be practiced. With reference to FIG. 6a, an example mobile computing device 600 for implementing the embodiments is illustrated. In a basic configuration, mobile computing device 600 is a handheld computer having both input elements and output elements. Input elements may include display 605, e.g., a touch screen display, and input buttons 610 that allow the user to enter information into mobile computing device 600. Mobile computing device 600 may also incorporate an optional side input element 615 allowing further user input. Optional side input element 615 may be a rotary switch, a button, or any other type of manual input element. In alternative embodiments, mobile computing device 600 may incorporate more or less input elements. For example, display 605 may not be a touch screen in some embodiments. In yet another alternative embodiment, the mobile computing device is a portable phone system, such as a cellular phone having display 605 and input buttons 610. Mobile computing device 600 may also include an optional keypad 635. Optional keypad 635 may be a physical keypad or a "soft" keypad generated on the touch screen display.

Mobile computing device 600 incorporates output elements, such as display 605, which can display a graphical user interface (GUI). Other output elements include speaker 625 and LED light 624. Additionally, mobile computing device 600 may incorporate a vibration module (not shown), which causes mobile computing device 600 to vibrate to notify the user of an event. In yet another embodiment, mobile computing device 600 may incorporate a headphone jack (not shown) for providing another means of providing output signals.

Although described herein in combination with mobile computing device 600, alternative embodiments may be used in combination with any number of computer systems, such as in desktop environments, laptop or notebook computer systems, multiprocessor systems, micro-processor based or programmable consumer electronics, network PCs, mini computers, main frame computers and the like. Embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments.

FIG. 6b is a block diagram illustrating components of a mobile computing device used in one embodiment, such as the computing device shown in FIG. 6a. That is, mobile computing device 600 can incorporate system 602 to implement some embodiments. For example, system 602 can be used in implementing a "smart phone" that can run one or more applications similar to those of a desktop or notebook computer such as, for example, browser, e-mail, scheduling, instant messaging, and media player applications. In some embodiments, system 602 is integrated as a computing device, such as an integrated personal digital assistant (PDA) and wireless phone. System 602 may be provided a display 605 and keypad 635 to provide input to system 602. System 602 may also include a peripheral device port 632 to allow the system 602 to be coupled to peripheral devices.

One or more application programs 666 may be loaded into memory 662 and run on or in association with operating system 664. Examples of application programs include phone dialer programs, e-mail programs, PIM (personal information management) programs, word processing programs, spreadsheet programs, Internet browser programs, messaging programs, and so forth. System 602 also includes non-volatile storage 668 within memory 662. Non-volatile storage 668 may be used to store persistent information that may be lost if system 602 is powered down. Applications 666 may use and store information in non-volatile storage 668, such as e-mail or other messages used by an e-mail application, and the like. A synchronization application (not shown) also resides on system 602 and is programmed to interact with a corresponding synchronization application resident on a host computer to keep the information stored in non-volatile storage 668 synchronized with corresponding information stored at the host computer. As appreciated by those skilled in the art, other applications may be loaded into memory 662 and run on the computing device 600, including the contact aggregation module 620, described herein.

System 602 has a power supply 670, which may be implemented as one or more batteries. Power supply 670 might further include an external power source, such as an AC adapter or a powered docking cradle that supplements or recharges the batteries.

System 602 may also include a radio 672 that performs the function of transmitting and receiving radio frequency communications. Radio 672 facilitates wireless connectivity between system 602 and the "outside world", via a communications carrier or service provider. Transmissions to and from radio 672 are conducted under control of the operating system (OS) 664. In other words, communications received by radio 672 may be disseminated to application programs 666 via OS 664, and vice versa.

Radio 672 allows system 602 to communicate with other computing devices, such as over a network. Radio 672 is one example of communication media. Communication media may typically be embodied by computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

This embodiment of system 602 is shown with two types of notification output devices; LED 624 that can be used to provide visual notifications and an audio interface 674 that can be used to provide audio notifications. These devices may be directly coupled to power supply 670 so that when activated, they remain on for a duration dictated by the notification mechanism even though processor 660 and other components might shut down for conserving battery power.

LED 624 may be programmed to remain on indefinitely until the user takes action to indicate the powered-on status of the device. Audio interface 674 is used to provide audible signals to and receive audible signals from the user. For example, in addition to being coupled to speaker 625 as shown in FIG. 6*a*, audio interface 674 may also be coupled to a microphone 626 shown in FIG. 6*a* to receive audible input, such as to facilitate a telephone conversation. In accordance with embodiments, the microphone 626 may also serve as an audio sensor to facilitate control of notifications, as described below. System 602 may further include video interface 676 that enables an operation of on-board camera 630 to record still images, video stream, and the like.

A system 602 for implementing mobile computing device 600 may have additional features or functionality. For example, the device may also include additional data storage devices (removable and/or non-removable) such as, magnetic disks, optical disks, or tape. Such additional storage is illustrated in FIG. 6*b* by storage 668. Computer-readable storage media may include volatile and nonvolatile, removable and non-removable media implemented in any method or technology for storage of information, such as computer-readable instructions, data structures, program modules, or other data.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. Contact data may be stored locally or in memory, wherein a local copy may be updated as the contact data from the original source is updated. Such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates a system architecture for providing updated aggregate contact information, as described above. Aggregate contact information developed, interacted with or edited in association with a contact aggregation module 720 may be stored in different communication channels or other storage types. For example, updated aggregate contact information along with information from which the updated aggregate contact information is developed may be stored using directory services 722, web portals 724, mailbox services 726, instant messaging stores 728 and social networking sites 730 and accessed by application 740. The contact aggregation module 720 may use any of these types of systems or the like for enabling data utilization, as described herein. A server 750 may provide the updated aggregate contact information to clients. As one example, server 750 may be a web server providing updated aggregate contact information over the web. Server 750 may provide updated aggregate contact information over the web to clients through a network 715. Examples of clients that may obtain updated aggregate contact information include computing device 702, which may include any general purpose personal computer, a tablet computing device 704 and/or mobile computing device 706, such as smart phones. Any of these devices may obtain content from the store 716.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-4. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

Those skilled in the art recognize that various modifications or variations may be made to embodiments without departing from the scope or spirit. Other embodiments are apparent to those skilled in the art from consideration of the specification and practice of the embodiments disclosed herein.

What is claimed is:

1. A method for aggregating contact data of a user, comprising:
    receiving, from the user over a network, a user-defined request associated with the user to obtain contact data associated with a contact of the user from a plurality of sources;
    obtaining contact data associated with the contact from the plurality of sources;
    processing the contact data to generate an aggregated collection of contact data, wherein processing the contact data further comprises:
        receiving, from the user over the network, a user-defined preference order associated with the user for the plurality of sources; and
        providing the aggregated collection of contact data for presentation in ranked order according to the user-defined preference order;
    associating, with at least one contact data in the aggregated collection of contact data, a link that provides access to the at least one contact data at the source of the contact data; and
    transmitting, to the user over the network, the aggregated collection of contact data for the contact.

2. The method of claim 1, wherein the user-defined request specifies a specific type of content to obtain from each of the plurality of sources.

3. The method of claim 1, wherein the aggregated collection of contact data comprises schedule information.

4. The method of claim 3, wherein the schedule information comprises a scheduling assistant.

5. The method of claim 4, wherein the scheduling assistant is integrated with calendar information that is updated as the calendar information is updated at an internal source or an external source.

6. The method of claim 4, wherein the scheduling assistant is integrated with location information that is updated as the location information is updated at an internal source or an external source.

7. The method of claim 1, wherein obtaining the contact data comprises obtaining contact data from at least one external source, the at least one external source comprising at least one of a social networking site or a business networking site.

8. A system for aggregating contact data of a user, comprising:
 a communication device for communicating over a network;
 a processor; and
 memory coupled to the processor and to the communication device and storing instructions, that when executed by the processor, cause the processor to perform a method, comprising:
  receiving, from the user through the communication device, a user-defined request associated with the user to obtain contact data associated with a contact of the user from a plurality of sources;
  obtaining contact data associated with the contact from the plurality of sources, the plurality of sources including at least one internal source and at least one external source;
  processing the contact data to generate an aggregated collection of contact data, wherein processing the contact data comprises:
   receiving, from the user, a user-defined preference order associated with the user for the plurality of sources; and
   providing the aggregated collection of contact data for presentation in ranked order according to the user-defined preference order;
  associating, with at least one contact data in the aggregated collection of contact data, a link that provides access to the at least one contact data at the respective source of the contact data; and
  transmitting, to the user through the communication device, the aggregated collection of contact data.

9. The system of claim 8, wherein the user-defined request specifies a specific type of content to obtain from each of the plurality of sources.

10. The system of claim 8, wherein the aggregated collection of contact data comprises schedule information.

11. The system of 30, wherein the schedule information comprises a scheduling assistant.

12. The system of claim 11, wherein the scheduling assistant is integrated with calendar information that is updated as the calendar information is updated at the at least one internal source or the at least one external source.

13. The system of claim 11, wherein the scheduling assistant is integrated with location information that is updated as the location information is updated at the at least one internal source or the at least one external source.

14. The system of claim 8, wherein the at least one external source comprises at least one of a social networking site or a business networking site.

15. A computer storage memory device including executable instructions which, when executed by a processor, perform a method for aggregating contact data of a user, the method comprising:
 receiving, from a user, a user-defined request associated with the user to obtain contact data associated with a contact of the user from a plurality of sources;
 obtaining a subset of contact data associated with the contact from each source;
 processing the subsets of contact data to generate an aggregated collection of contact data, wherein processing the subsets of contact data comprises:
  receiving, from the user, a user-defined preference order associated with the user for the plurality of sources; and
  ranking the aggregated collection of contact data in a ranked order according to the user-defined preference order for the plurality of sources;
 associating, with at least one contact data in the ranked aggregated collection of contact data, a link that provides access to the at least one contact data at the source of the contact data; and
 transmitting, to the user, the ranked aggregated collection of contact data.

16. The computer storage memory device of claim 15, wherein the user-defined request specifies a specific type of content to obtain from each of the plurality of sources.

17. The computer storage memory device of claim 15, wherein the aggregated collection of contact data comprises schedule information.

18. The computer storage memory device of claim 17, wherein the schedule information comprises a scheduling assistant.

19. The computer storage memory device of claim 18, wherein the scheduling assistant is integrated with calendar information that is updated as the calendar information is updated at an internal or an external source.

20. The computer storage memory device of claim 18, wherein the scheduling assistant is integrated with location information that is updated as the location information is updated at an internal source or an external source.

* * * * *